United States Patent
Lisuk et al.

(10) Patent No.: US 9,390,086 B2
(45) Date of Patent: Jul. 12, 2016

(54) CLASSIFICATION SYSTEM WITH METHODOLOGY FOR EFFICIENT VERIFICATION

(71) Applicant: PALANTIR TECHNOLOGIES INC., Palo Alto, CA (US)

(72) Inventors: David Lisuk, San Diego, CA (US); Steven Holtzen, Arcadia, CA (US)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 0 days.

(21) Appl. No.: 14/483,527

(22) Filed: Sep. 11, 2014

(65) Prior Publication Data

US 2016/0078022 A1   Mar. 17, 2016

(51) Int. Cl.
| | |
|---|---|
| G06F 17/28 | (2006.01) |
| G06F 17/21 | (2006.01) |
| G06F 17/30 | (2006.01) |
| G06F 3/0484 | (2013.01) |
| G06N 99/00 | (2010.01) |

(52) U.S. Cl.
CPC ........ G06F 17/2863 (2013.01); G06F 3/04842 (2013.01); G06F 17/218 (2013.01); G06F 17/30707 (2013.01); G06N 99/005 (2013.01)

(58) Field of Classification Search
None
See application file for complete search history.

(56) References Cited

U.S. PATENT DOCUMENTS

| | | | |
|---|---|---|---|
| 6,430,305 | B1 | 8/2002 | Decker |
| 6,820,135 | B1 | 11/2004 | Dingman |
| 6,978,419 | B1 | 12/2005 | Kantrowitz |
| 6,980,984 | B1 | 12/2005 | Huffman et al. |
| 7,168,039 | B2 | 1/2007 | Bertram |
| 7,617,232 | B2 | 11/2009 | Gabbert et al. |

(Continued)

FOREIGN PATENT DOCUMENTS

| | | |
|---|---|---|
| CN | 102546446 | 7/2012 |
| CN | 103167093 | 6/2013 |

(Continued)

OTHER PUBLICATIONS

Sigrist, Christian JA, et al. "PROSITE, a protein domain database for functional characterization and annotation." Nucleic acids research 38.suppl 1 (2010): D161-D166.*

(Continued)

*Primary Examiner* — Kakali Chaki
*Assistant Examiner* — Daniel Pellett
(74) *Attorney, Agent, or Firm* — Hickman Palermo Becker Bingham LLP

(57) ABSTRACT

Techniques for a classification system with methodology for enhanced verification are described. In one approach, a classification computer trains a classifier based on a set of training documents. After training is complete, the classification computer iterates over a collection unlabeled documents uses the trained classifier to predict a label for each unlabeled document. A verification computer retrieves one of the documents assigned a label by the classification computer. The verification computer then generates a user interface that displays select information from the document and provides an option to verify the label predicted by the classification computer or provide an alternative label. The document and the verified label are then fed back into the set of training documents and are used to retrain the classifier to improve subsequent classifications. In addition, the document is indexed by a query computer based on the verified label and made available for search and display.

18 Claims, 8 Drawing Sheets

(56) References Cited

U.S. PATENT DOCUMENTS

| | | |
|---|---|---|
| 7,756,843 B1 | 7/2010 | Palmer |
| 7,899,796 B1 | 3/2011 | Borthwick et al. |
| 7,917,376 B2 | 3/2011 | Bellin et al. |
| 7,941,321 B2 | 5/2011 | Greenstein et al. |
| 8,036,971 B2 | 10/2011 | Aymeloglu et al. |
| 8,046,283 B2 | 10/2011 | Burns |
| 8,054,756 B2 | 11/2011 | Chand et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,386,377 B1 | 2/2013 | Xiong et al. |
| 8,473,454 B2* | 6/2013 | Evanitsky et al. ............ 707/608 |
| 8,484,115 B2 | 7/2013 | Aymeloglu et al. |
| 8,577,911 B1 | 11/2013 | Stepinski et al. |
| 8,589,273 B2 | 11/2013 | Creeden et al. |
| 8,688,573 B1 | 4/2014 | Rukonic et al. |
| 8,744,890 B1 | 6/2014 | Bernier |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,924,388 B2 | 12/2014 | Elliot et al. |
| 8,924,389 B2 | 12/2014 | Elliot et al. |
| 8,938,686 B1 | 1/2015 | Erenrich et al. |
| 8,949,164 B1 | 2/2015 | Mohler |
| 9,069,842 B2 | 6/2015 | Melby |
| 9,100,428 B1 | 8/2015 | Visbal |
| 9,111,281 B2 | 8/2015 | Stibel et al. |
| 9,129,219 B1 | 9/2015 | Robertson et al. |
| 9,256,664 B2 | 2/2016 | Chakerian et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2003/0126102 A1 | 7/2003 | Borthwick |
| 2004/0034570 A1 | 2/2004 | Davis |
| 2004/0111480 A1 | 6/2004 | Yue |
| 2004/0153418 A1 | 8/2004 | Hanweck |
| 2004/0236688 A1 | 11/2004 | Bozeman |
| 2005/0010472 A1 | 1/2005 | Quatse et al. |
| 2005/0086207 A1 | 4/2005 | Heuer et al. |
| 2005/0154628 A1 | 7/2005 | Eckart et al. |
| 2005/0154769 A1 | 7/2005 | Eckart et al. |
| 2006/0026120 A1 | 2/2006 | Carolan et al. |
| 2006/0080283 A1 | 4/2006 | Shipman |
| 2006/0143034 A1 | 6/2006 | Rothermel |
| 2006/0143075 A1 | 6/2006 | Carr et al. |
| 2006/0143079 A1 | 6/2006 | Basak et al. |
| 2007/0000999 A1 | 1/2007 | Kubo et al. |
| 2007/0011304 A1 | 1/2007 | Error |
| 2007/0038646 A1 | 2/2007 | Thota |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0185867 A1 | 8/2007 | Maga |
| 2007/0192122 A1 | 8/2007 | Routson et al. |
| 2007/0284433 A1 | 12/2007 | Domenica et al. |
| 2008/0208735 A1 | 8/2008 | Balet et al. |
| 2008/0222295 A1 | 9/2008 | Robinson et al. |
| 2008/0255973 A1 | 10/2008 | El Wade et al. |
| 2008/0313132 A1 | 12/2008 | Hao et al. |
| 2009/0094270 A1 | 4/2009 | Alirez et al. |
| 2009/0106178 A1 | 4/2009 | Chu |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0157732 A1 | 6/2009 | Hao et al. |
| 2009/0187546 A1 | 7/2009 | Whyte et al. |
| 2009/0187548 A1 | 7/2009 | Ji et al. |
| 2009/0249244 A1 | 10/2009 | Robinson et al. |
| 2009/0259636 A1 | 10/2009 | Labrou et al. |
| 2009/0271343 A1 | 10/2009 | Vaiciulis et al. |
| 2009/0307049 A1 | 12/2009 | Elliott et al. |
| 2009/0313463 A1 | 12/2009 | Pang et al. |
| 2009/0319418 A1 | 12/2009 | Herz |
| 2009/0319515 A1 | 12/2009 | Minton et al. |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradeteanu et al. |
| 2010/0057622 A1 | 3/2010 | Faith et al. |
| 2010/0070842 A1 | 3/2010 | Aymeloglu et al. |
| 2010/0098318 A1 | 4/2010 | Anderson |
| 2010/0106752 A1 | 4/2010 | Eckardt et al. |
| 2010/0114887 A1 | 5/2010 | Conway et al. |
| 2010/0131502 A1 | 5/2010 | Fordham |
| 2010/0161735 A1 | 6/2010 | Sharma |
| 2010/0191563 A1 | 7/2010 | Schlaifer et al. |
| 2010/0235915 A1 | 9/2010 | Memon et al. |
| 2010/0262688 A1 | 10/2010 | Hussain et al. |
| 2010/0312837 A1 | 12/2010 | Bodapati et al. |
| 2011/0061013 A1 | 3/2011 | Billicki et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0153384 A1 | 6/2011 | Horne et al. |
| 2011/0173093 A1 | 7/2011 | Psota et al. |
| 2011/0208565 A1 | 8/2011 | Ross et al. |
| 2011/0213655 A1 | 9/2011 | Henkin |
| 2011/0218955 A1 | 9/2011 | Tang |
| 2011/0270604 A1* | 11/2011 | Qi et al. ........................... 704/9 |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1* | 12/2011 | Chang ............... G06F 17/30646 707/740 |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0079363 A1 | 3/2012 | Folting et al. |
| 2012/0084117 A1 | 4/2012 | Tavares et al. |
| 2012/0084287 A1 | 4/2012 | Lakshminarayan et al. |
| 2012/0089606 A1 | 4/2012 | Eshwar et al. |
| 2012/0131512 A1 | 5/2012 | Takeuchi et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0245976 A1 | 9/2012 | Kumar et al. |
| 2012/0323888 A1 | 12/2012 | Osann, Jr. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0096988 A1 | 4/2013 | Grossman et al. |
| 2013/0110746 A1 | 5/2013 | Ahn |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1* | 7/2013 | El-Yaniv et al. ............ 707/748 |
| 2013/0226318 A1 | 8/2013 | Procyk |
| 2013/0238616 A1 | 9/2013 | Rose et al. |
| 2013/0246170 A1 | 9/2013 | Gross et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095509 A1 | 4/2014 | Patton |

(56) References Cited

U.S. PATENT DOCUMENTS

| | | |
|---|---|---|
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0222521 A1 | 8/2014 | Chait |
| 2014/0222793 A1 | 8/2014 | Sadkin et al. |
| 2014/0229554 A1 | 8/2014 | Grunin et al. |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0073929 A1 | 3/2015 | Psota et al. |
| 2015/0073954 A1 | 3/2015 | Braff |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0188872 A1 | 7/2015 | White |
| 2015/0242401 A1 | 8/2015 | Liu |
| 2015/0338233 A1 | 11/2015 | Cervelli et al. |
| 2015/0379413 A1 | 12/2015 | Robertson et al. |
| 2016/0004764 A1 | 1/2016 | Chakerian et al. |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| WO | WO 2005/116851 | 12/2005 |

OTHER PUBLICATIONS

Cohn, David, Rich Caruana, and Andrew McCallum. "Semi-supervised clustering with user feedback." Constrained Clustering: Advances in Algorithms, Theory, and Applications 4.1 (2003): 17-32.*

U.S. Appl. No. 14/225,084, filed Mar. 25, 2014, First Office Action Interview, Sep. 2, 2014.

U.S. Appl. No. 14/571,098, filed Dec. 15, 2014, First Office Action Interview, Aug. 24, 2015.

U.S. Appl. No. 14/571,098, filed Dec. 15, 2014, First Office Action Interview, Nov. 10, 2015.

U.S. Appl. No. 14/225,006, filed Mar. 25, 2014, First Office Action Interview, Sep. 10, 2014.

U.S. Appl. No. 14/225,160, filed Mar. 25, 2014, First Office Action Interview, Oct. 22, 2014.

U.S. Appl. No. 14/463,615, filed Aug. 19, 2014, First Office Action Interview, Nov. 13, 2014.

U.S. Appl. No. 13/827,491, filed Mar. 14, 2013, Office Action, Dec. 1, 2014.

U.S. Appl. No. 14/479,863, filed Sep. 8, 2014, First Office Action Interview, Dec. 26, 2014.

U.S. Appl. No. 14/800,447, filed Jul. 15, 2012, First Office Action Interview, Dec. 10, 2010.

U.S. Appl. No. 14/552,336, filed Nov. 24, 2014, Notice of Allowance, Nov. 3, 2015.

U.S. Appl. No. 14/319,161, filed Jun. 30, 2014, Final Office Action, Jan. 23, 2015.

U.S. Appl. No. 14/463,615, filed Aug. 19, 2014, First Office Action Interview, Jan. 28, 2015.

U.S. Appl. No. 14/225,160, filed Mar. 25, 2014, Final Office Action, Feb. 11, 2015.

U.S. Appl. No. 14/225,084, filed Mar. 25, 2014, First Office Action Interview, Feb. 20, 2015.

U.S. Appl. No. 14/451,221, filed Aug. 4, 2014, Office Action, Oct. 21, 2014.

U.S. Appl. No. 14/225,160, filed Mar. 25, 2014, First Office Action Interview, Jul. 29, 2014.

U.S. Appl. No. 14/225,006, filed Mar. 25, 2014, First Office Action Interview, Feb. 27, 2015.

U.S. Appl. No. 14/463,615, filed Aug. 19, 2014, Final Office Action, May 21, 2015.

U.S. Appl. No. 13/827,491, filed Mar. 14, 2013, Final Office Action, Jun. 22, 2015.

U.S. Appl. No. 14/552,336, filed Nov. 24, 2014, First Office Action Interview, Jul. 20, 2015.

U.S. Appl. No. 14/676,621, filed Apr. 1, 2015, Interview Summary, Jul. 30, 2015.

U.S. Appl. No. 14/571,098, filed Dec. 15, 2014, First Office Action Interview, Mar. 11, 2015.

U.S. Appl. No. 14/571,098, filed Dec. 15, 2014, First Office Action Interview, Aug. 5, 2015.

U.S. Appl. No. 14/225,160, filed Mar. 25, 2014, Office Action, Aug. 12, 2015.

U.S. Appl. No. 14/676,621, filed Apr. 1, 2015, Final Office Action, Oct. 29, 2015.

U.S. Appl. No. 13/827,491, filed Mar. 14, 2013, Office Action, Oct. 9, 2015.

U.S. Appl. No. 14/225,006, filed Mar. 25, 2014, Final Office Action, Sep. 2, 2015.

U.S. Appl. No. 14/631,633, filed Feb. 25, 2015, First Office Action Interview, Sep. 10, 2015.

U.S. Appl. No. 14/463,615, filed Aug. 19, 2014, Advisory Action, Sep. 10, 2015.

U.S. Appl. No. 14/225,084, filed Mar. 25, 2014, Office Action, Sep. 11, 2015.

U.S. Appl. No. 14/562,524, Dec. 5, 2014, First Office Action Interview, Sep. 14, 2015.

U.S. Appl. No. 14/813,749, filed Jul. 30, 2015, Office Action, Sep. 28, 2015.

U.S. Appl. No. 14/746,671, filed Jun. 22, 2015, First Office Action Interview, Sep. 28, 2015.

U.S. Appl. No. 14/141,252, filed Dec. 26, 2014, Office Action, Oct. 8, 2015.

U.S. Appl. No. 14/842,734, filed Sep. 1, 2015, First Office Action Interview, Nov. 19, 2015.

U.S. Appl. No. 14/562,524, filed Dec. 5, 2014, First Office Action Interview, Nov. 10, 2015.

U.S. Appl. No. 14/746,671, filed Jun. 22, 2015, Notice of Allowance, Jan. 21, 2016.

U.S. Appl. No. 14/225,160, filed Mar. 25, 2014, Advisory Action, May 20, 2015.

U.S. Appl. No. 14/746,671, filed Jun. 22, 2015, First Office Action Interview, Nov. 12, 2015.

U.S. Appl. No. 14/306,138, filed Jun. 16, 2014, Interview Summary, Dec. 3, 2015.

U.S. Appl. No. 14/463,615, filed Aug. 19, 2014, Office Action, Dec. 9, 2015.

U.S. Appl. No. 14/225,006, filed Mar. 25, 2014, Advisory Action, Dec. 21, 2015.

U.S. Appl. No. 14/306,147, filed Jun. 16, 2014, Final Office Action, Dec. 24, 2015.

U.S. Appl. No. 14/306,138, filed Jun. 16, 2014, Interview Summary, Dec. 24, 2015.

U.S. Appl. No. 14/225,084, filed Mar. 25, 2014, Interview Summary, Mar. 25, 2014.

U.S. Appl. No. 14/225,160, filed Mar. 25, 2014, Final Office Action, Jan. 25, 2016.

(56) References Cited

OTHER PUBLICATIONS

Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Countly Mobile Analytics, <http://count.ly/> Printed Jul. 18, 2013 in 9 pages.
Distimo—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in 18 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Official Communication for Great Britain Patent Application No. 1404489.5 dated Oct. 6, 2014.
Official Communication for European Patent Application No. 14187996.5 dated Feb. 12, 2015.
Official Communication for European Patent Application No. 14200298.9 dated May 13, 2015.
Official Communication for Great Britain Patent Application No. 1404486.1 dated May 21, 2015.
Official Communication for Great Britain Patent Application No. 1404489.5 dated May 21, 2015.
Official Communication for European Patent Application No. 14191540.5 dated May 27, 2015.
Official Communication for European Patent Application No. 14200246.8 dated May 29, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for Great Britain Patent Application No. 1404499.4 dated Aug. 20, 2014.
Official Communication for New Zealand Patent Application No. 628161 dated Aug. 25, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404499.4 dated Jun. 11, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for European Patent Application No. 15181419.1 dated Sep. 29, 2015.
Official Communication for European Patent Application No. 15184764.7 dated Dec. 14, 2015.
U.S. Appl. No. 14/225,084, filed Mar. 25, 2014, Notice of Allowance, May 4, 2015.
U.S. Appl. No. 14/571,098, filed Dec. 15, 2014, Final Office Action, Feb. 23, 2016.
U.S. Appl. No. 14/225,084, filed Mar. 25, 2014, Interview Summary, Jan. 4, 2016.
U.S. Appl. No. 14/319,765, filed Jun. 30, 2014, Office Action, Feb. 1, 2016.
U.S. Appl. No. 14/225,160, filed Mar. 25, 2014, Interview Summary, Apr. 22, 2016.
U.S. Appl. No. 14/929,584, filed Nov. 2, 2015, Office Action, Feb. 4, 2016.

(56) References Cited

OTHER PUBLICATIONS

U.S. Appl. No. 14/323,935, filed Jul. 3, 2014, Notice of Allowance, Oct. 1, 2015.
U.S. Appl. No. 14/479,863, filed Sep. 8, 2014, Notice of Allowance, Mar. 31, 2015.
U.S. Appl. No. 14/800,447, filed Jul. 15, 2012, First Office Action, Dec. 10, 2010.
U.S. Appl. No. 14/319,161, filed Jun. 30, 2014, Notice of May 4, 2015.
Official Communication for European Patent Application No. 14187996.5 dated Feb. 19, 2016.

* cited by examiner

CLASSIFICATION SYSTEM WITH METHODOLOGY FOR EFFICIENT VERIFICATION

TECHNICAL FIELD

The disclosed technologies relate generally to classification systems and, more particularly, to classification systems with methodologies for efficient verification of machine learning generated labels.

BACKGROUND

Machine learning is a sub-field of Artificial Intelligence (AI) that focuses on the construction and study of systems that can learn from data, rather than following only explicitly programmed instructions. For example, techniques related to machine learning have been employed in a wide range of computing tasks where explicit rule-based algorithms are difficult to employ, such as spam filtering, optical character recognition (OCR), search engines, computer vision, and so forth. Machine learning techniques can be of several forms, but generally fall within one of the broad categories of supervised learning, unsupervised learning, or semi-supervised learning.

In supervised learning, the computer learner ("classifier") is presented with training data representing example sets of inputs ("features") and their corresponding outputs ("labels"). The goal is to learn, based on the training data, a general rule that maps sets of features to a predicted label ("training the classifier"). After being trained, the classifier can then apply the general rule to a new set of features that the classifier had not previously encountered. For example, in the problem domain of spam detection, a classifier may be trained on a set of emails that have been labeled "spam" or "not spam" in order to produce a program capable of determining whether a previously unseen email should be blocked as spam or is safe for the user to view.

In unsupervised learning no labels are provided, leaving the classifier to determine on its own groups of similar inputs ("clustering"). Unsupervised learning can be a goal in itself (discovering hidden patterns in data) or used as a means toward an end. For example, topic modeling is a problem domain in which unsupervised learning can be applied to discover documents which share the same or similar topics, without necessarily knowing the potential topics beforehand. Semi-supervised learning relates to techniques that make use of both labeled and unlabeled data for training.

One major issue in the field of ML is the acquisition of labeled data. For example, depending on the problem domain, labeling may require the expertise of a human agent (e.g. identifying the words spoken in an audio segment) or a physical experiment (e.g. determining whether there is oil at a location with particular characteristics). Thus, the monetary and labor cost associated with the labeling process may render comprehensive labeled training data difficult to procure. In such cases, semi-supervised algorithms can be of great practical use since this class of learners does not assume that the labeled training data is a comprehensive representation of the problem domain.

Active learning, a special case of semi-supervised learning, allows the classifier to identify unlabeled sets of features whose label would most benefit future classifications. For example, classifiers often return a score for each potential label that represents the probability that the label is correct for a given set of features. Most often, the top scoring label is considered the prediction of the classifier. However, if the top scores differ only minimally, the set of features represents a borderline case where the classifier has encountered difficulty deciding between two or more different labels. To resolve the ambiguity, the classifier submits the set of features to an "oracle" (often a human user), who provides the correct label, allowing the classifier to retrain while taking into account this new data point. As a result, only a select portion of the unlabeled data that is determined to be helpful in deciding future cases is reviewed by an external entity, thus reducing labeling costs.

However, although the aforementioned techniques can result in labels with a reasonable degree of accuracy, there is always a risk of mislabeling. While for many problem domains a high degree of accuracy is acceptable, others are intolerant of even slight errors. For example, in the problem domain of identifying which target protein is the focus of a drug trial, the findings discussed in those reports may represent the result of an extremely costly experiment. Consequently, the risk of the report being misclassified and incorrectly indexed for search could render that knowledge, which had been obtained at great cost, unable to be effectively located for review by medical professionals. For many research institutions, this is an unacceptable risk that prevents automated ML techniques from being fully utilized. Traditionally, problem domains such as the previous example have been troublesome, often requiring a skilled human researcher to manually verify each document through hours of painstaking reading to provide an appropriate label. However, as the number of research papers drastically increases, it becomes more difficult for reviewers to keep up with the demand. Furthermore, due to the requirement of specialized knowledge in the research field, expanding the circle of reviewers is also difficult. As a result, it would be beneficial to provide a classification system that can leverage ML techniques to ease the burden on the reviewers, without fully omitting the reviewers from the labeling process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The appended claims may serve as a summary of some embodiments of the invention.

DETAILED DESCRIPTION

Figure 1:
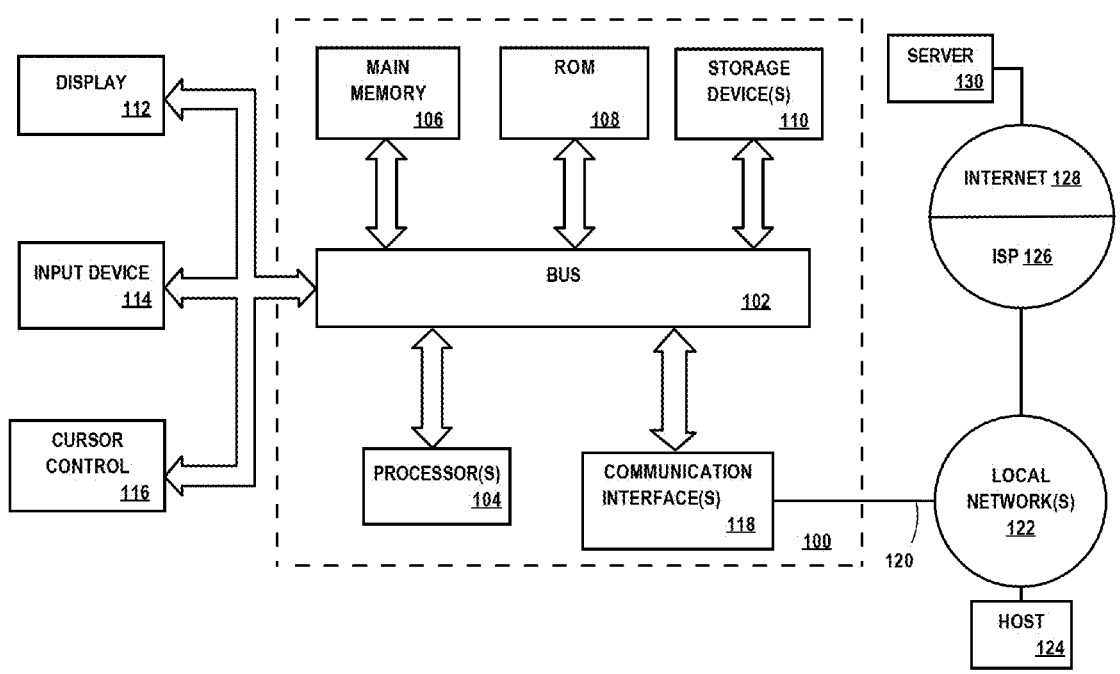
FIG. 1 is a very general block diagram of a basic computing device in which the disclosed technologies may be embodied.

In the following description, for the purposes of explanation, numerous specific details are set forth in order to provide a thorough understanding of the disclosed technologies. It will be apparent, however, that the disclosed technologies can be practiced without these specific details. In other instances, well-known structures and devices are shown in block diagram form in order to avoid unnecessarily obscuring the disclosed technologies. As to the flowcharts, each block within the flowcharts represents both a method step and an apparatus element for performing the method step. Depending upon the requirements of the particular implementation at hand, the corresponding apparatus element may be configured in hardware, software, firmware or combinations thereof.

1.0 Overview

Techniques for a classification system with methodology for enhanced verification are described.

In one approach, a classification computer trains a classifier based on a set of training documents. After training is complete, the classification computer iterates over a collection unlabeled documents and uses the trained classifier to predict a label for each unlabeled document. A verification computer retrieves one of the documents assigned a label by the classification computer. The verification computer then generates a user interface that displays select information from the document and provides an option to verify the label predicted by the classification computer or provide an alternative label.

For example, the verification computer may emphasize specific linguistic structures in the document that are relevant to the classification process performed by the classification computer. As another example, the verification computer may filter out portions of the document that do not contain relevant information used for determining a label for the document. As yet another example, the verification computer may display the potential labels considered for the document and the relative probabilities or confidences of each of those labels being correct.

The document and the verified label are then fed back into the set of training documents and are used to retrain the classifier to improve subsequent classifications. In addition, the document is indexed by a query computer based on the verified label and made available for search and display. As a result, the classifications assigned by the classification computer are efficiently verified by drawing the reviewer's attention to parts of the document relevant to the classification process. Thus, for any machine learner and/or problem domain which requires a reviewer to label documents (e.g. active learning, verifying critical documents, etc.), the review is expedited by identifying information that is likely to be relevant to the classification process.

In an embodiment, a method comprises obtaining a document; determining, using a trained classifier, a candidate label for the document from a plurality of labels; selecting one or more linguistic structures from the document; displaying a user interface that presents data from the document, including at least a portion of the one or more linguistic structures, and the candidate label, wherein the portion of the one or more linguistic structures are displayed by the user interface, wherein the user interface includes one or more user interface controls which present a first option to accept the candidate label for the document and a second option to select a different label for the document; receiving, via the one or more user interface controls, input representing selection of the first option or the second option; associating the document with a verified label; wherein the method is performed by one or more computing devices.

In an embodiment, the trained classifier has been trained using a set of labeled documents, the verified label is the candidate label if the first option is selected by the input, and the verified label is the different label if the second option is selected by the input, and the method further comprises: adding the document and the verified label to the set of labeled documents; retraining the trained classifier based on the set of labeled documents to which the document and the verified label have been added.

In an embodiment, the data includes at least a section of text from the document and the method further comprises: receiving user input representing selection of one or more portions of the section of the text, wherein the selection of the one or more portions of the section of the text causes a change to one or more weights assigned to the one or more portions of the section of the text by the trained classifier during retraining.

In an embodiment, determining, using the trained classifier, the candidate label for the document includes at least: receiving, from the trained classifier, a respective score for each label of the plurality of labels, wherein the respective score represents a confidence of the trained classifier with respect to the label being correct for the document.

In an embodiment, the trained classifier determines the respective score for each classification by at least: determining, for each document portion of a plurality of document portions of the document, a respective sub-score for the document portion; determining the respective score of the document based on aggregating the respective sub-score for each document portion of the plurality of document portions.

In an embodiment, the method further comprises: assigning, to each document portion of the plurality of document portions a respective weight, wherein the sub-score for each document portion of the plurality of document portions is weighted by the respective weight for the document portion when aggregating the respective sub-score for each document portion of the plurality of document portions.

In an embodiment, the method further comprises selecting one or more document portions of the plurality of document portions of the document to include in the data based on the respective sub-score of each document portion of the plurality of document portions.

In an embodiment, the document and each labeled document of the set of labeled documents represent medical reports that discuss a respective target protein of a plurality of target proteins and each label of the plurality of labels relates to at least one target protein of the plurality of target proteins.

In an embodiment, each linguistic structure of the one or more linguistic structures is associated with at least one label of the plurality of labels, the one or more linguistic structures are displayed by the user interface in a visually distinguished manner compared to other one or more linguistic structures displayed by the user interface, and the user interface includes second one or more user interface controls which, when selected, each cause toggling of the visually distinguished manner of one or more respective linguistic structures, of the portion of the linguistic structures displayed by the user interface, that are associated with a respective label of the plurality of labels.

In an embodiment, the user interface includes third one or more user interface controls which, when selected, cause the user interface to toggle between displaying the data from the document and an original version of the document.

In other embodiments, a system, computer apparatus, and/or a computer-readable medium are configured to carry out the foregoing steps.

2.0 Basic Computing Environment

The disclosed technologies may be implemented on one or more computing devices. Such a computing device may be implemented in various forms including, but not limited to, a client, a server, a network device, a mobile device, a cell phone, a smart phone, a laptop computer, a desktop computer, a workstation computer, a personal digital assistant, a blade server, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies may have different components, including components with different connections, relationships, and functions.

2.1 Basic Computing Device

FIG. 1 is a block diagram that illustrates an example of a computing device 100 suitable for implementing the disclosed technologies. Computing device 100 includes bus 102 or other communication mechanism for addressing main memory 106 and for transferring data between and among the various components of device 100. Computing device 100 also includes one or more hardware processors 104 coupled with bus 102 for processing information. A hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor(s) 104. Main memory 106 also may be used for storing temporary variables or other intermediate information during execution of instructions to be executed by processor(s) 104. Such instructions, when stored in non-transitory storage media accessible to processor(s) 104, render computing device 100 into a special-purpose computing device that is customized to perform the operations specified in the instructions.

Computing device 100 further includes read only memory (ROM) 108 or other static storage device coupled to bus 102 for storing static information and instructions for processor(s) 104.

One or more mass storage devices 110 are coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor(s) 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor(s) 104 executing one or more sequences of one or more instructions contained in main memory 106. Such instructions may be read into main memory 106 from another storage medium, such as storage device(s) 110. Execution of the sequences of instructions contained in main memory 106 causes processor(s) 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor(s) 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor(s) 104 retrieves and executes the instructions. The instructions received by main memory 106 may optionally be stored on storage device(s) 110 either before or after execution by processor(s) 104.

Computing device 100 also includes one or more communication interface(s) 118 coupled to bus 102. A communication interface 118 provides a two-way data communication coupling to a wired or wireless network link 120 that is connected to a local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link(s) 120 typically provide data communication through one or more networks to other data devices. For example, a network link 120 may provide a connection through a local network 122 to a host computer 124 or to data equipment operated by an Internet Service Provider (ISP) 126. ISP 126 in turn provides data communication services through the world wide packet data communication network now commonly referred to as the "Internet" 128. Local network(s) 122 and Internet 128 use electrical, electromagnetic or optical signals that carry digital data streams. The signals through the various networks and the signals on network link(s) 120 and through communication interface(s) 118, which carry the digital data to and from computing device 100, are example forms of transmission media.

Computing device 100 can send messages and receive data, including program code, through the network(s), network link(s) 120 and communication interface(s) 118. In the Internet example, a server 130 might transmit a requested code for an application program through Internet 128, ISP 126, local network(s) 122 and communication interface(s) 118.

The received code may be executed by processor 104 as it is received, and/or stored in storage device 110, or other non-volatile storage for later execution.

2.2 Basic Software System

Figure 2:
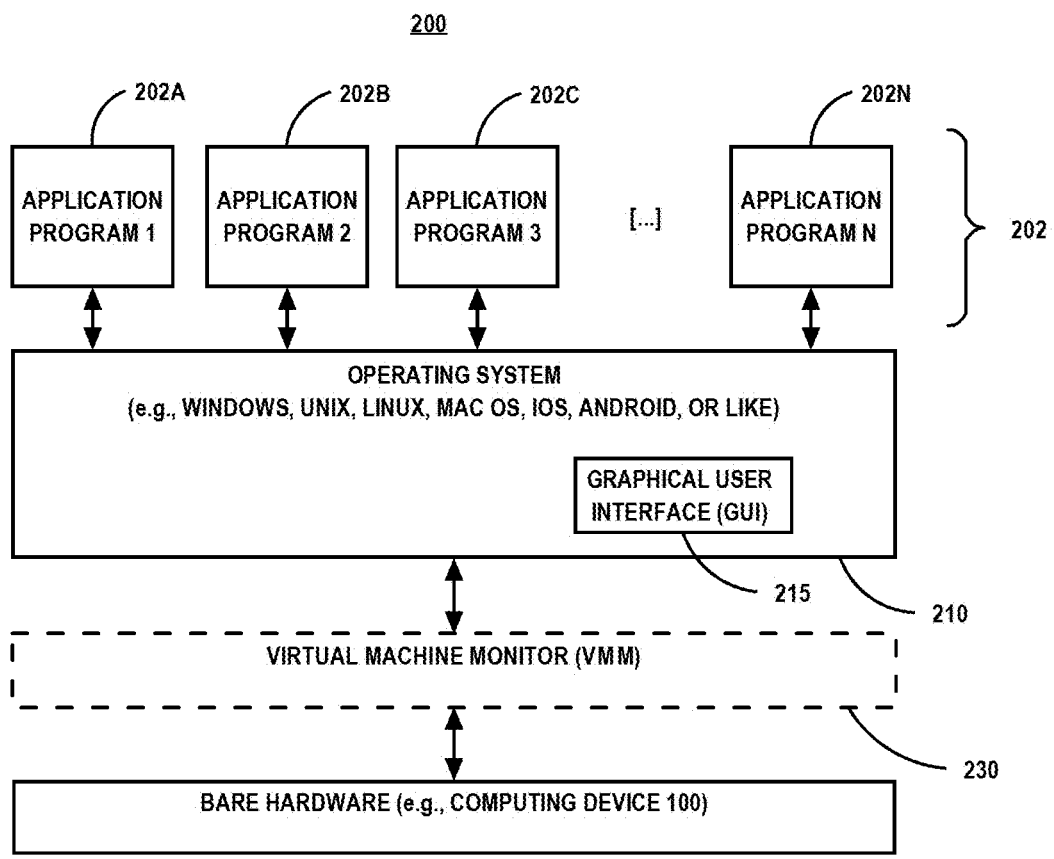
FIG. 2 is a block diagram of a basic software system for controlling the operation of the computing device.

FIG. 2 is a block diagram of a software system for controlling the operation of computing device 100. As shown, a computer software system 200 is provided for directing the operation of the computing device 100. Software system 200, which is stored in system memory (RAM) 106 and on fixed storage (e.g., hard disk) 110, includes a kernel or operating system (OS) 210. The OS 210 manages low-level aspects of computer operation, including managing execution of processes, memory allocation, file input and output (I/O), and device I/O. One or more application programs, such as client application software or "programs" 202 (e.g., 202A, 202B, 202C . . . 202N) may be "loaded" (i.e., transferred from fixed storage 110 into memory 106) for execution by the system 200. The applications or other software intended for use on the device 100 may also be stored as a set of downloadable computer-executable instructions, for example, for downloading and installation from an Internet location (e.g., Web server).

Software system 200 may include a graphical user interface (GUI) 215, for receiving user commands and data in a graphical (e.g., "point-and-click" or "touch gesture") fashion. These inputs, in turn, may be acted upon by the system 200 in accordance with instructions from operating system 210 and/or client application module(s) 202. The GUI 215 also serves to display the results of operation from the OS 210 and application(s) 202, whereupon the user may supply additional inputs or terminate the session (e.g., log off).

The OS 210 can execute directly on the bare hardware (e.g., processor(s) 104) of device 100. Alternatively, a hypervisor or virtual machine monitor (VMM) 230 may be interposed between the bare hardware and the OS 210. In this configuration, VMM 230 acts as a software "cushion" or virtualization layer between the OS 210 and the bare hardware of the device 100.

VMM 230 instantiates and runs virtual machine instances ("guest machines"). Each guest machine comprises a "guest" operating system, such as OS 210, and one or more applications, such as applications 202, designed to execute on the guest operating system. The VMM 230 presents the guest operating systems with a virtual operating platform and manages the execution of the guest operating systems. In some instances, the VMM 230 may allow a guest operating system to run as through it is running on the bare hardware of the device 100 directly. In these instances, the same version of the guest operating system configured to execute on the bare hardware directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing the disclosed technologies. The disclosed technologies, however, are not limited to any particular computing environment or computing device configuration. Instead, the disclosed technologies may be implemented in any type of system architecture or processing environment capable of supporting the disclosed technologies presented in detail below.

3.0 Example Operating Environment

Figure 3:
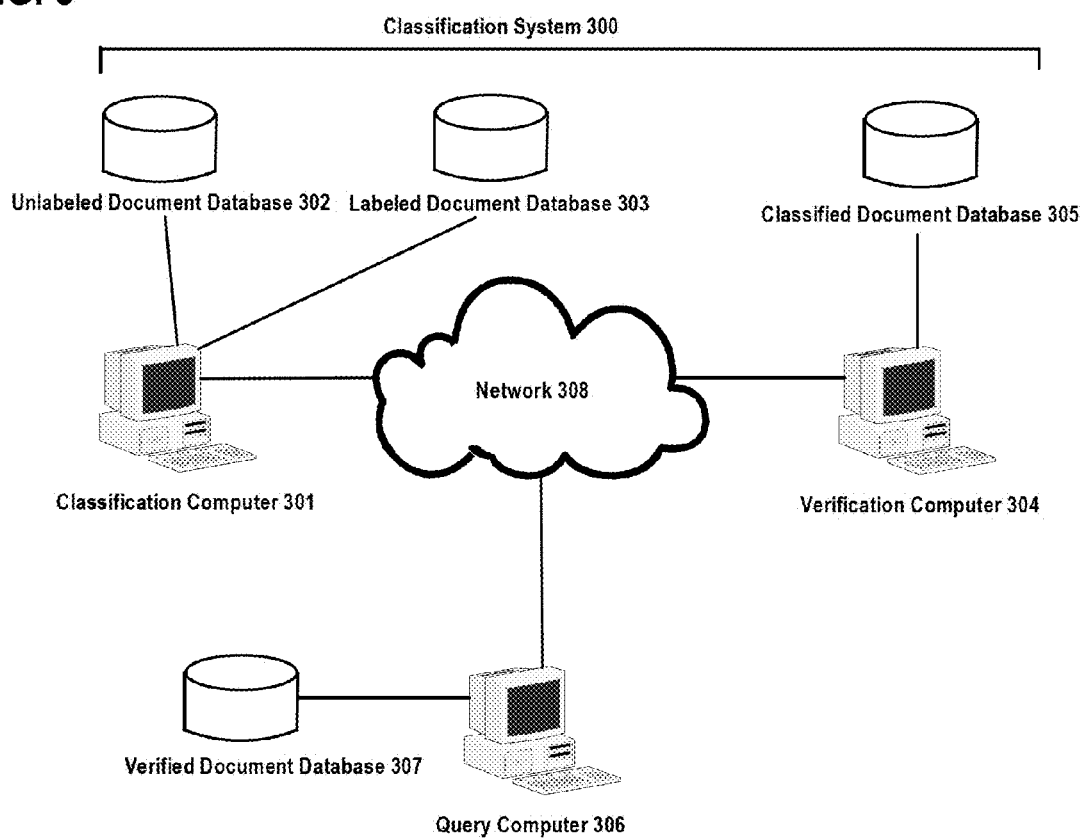
FIG. 3 is a diagram of an example classification system in which the disclosed technologies may be implemented.

While the disclosed technologies may operate within a single standalone computing device (e.g., device 100 of FIG. 1), the disclosed technologies may be implemented in a classification system. FIG. 3 is a diagram of an example classification system 300 in which the disclosed technologies may be implemented.

In an embodiment, classification computer 301, verification computer 304, and query computer 306 each represent a computing device, such as the device 100 depicted in FIG. 1. However, in other embodiments, the functions and responsibilities described in relation to the classification computer 301, verification computer 304, and query computer 306 may be performed by software components executing on one or more computing devices. Furthermore, in other embodiments, the functions and responsibilities described in relation to any of the classification computer 301, verification computer 304, and query computer 306 may be distributed across any number of different computing devices.

In an embodiment, unlabeled document database 302, labeled document database 303, classified document database 305, and verified document database 307 each represent a collection of storage devices and/or software components that are configured to store and/or manage data. For example, each of the aforementioned databases may be implemented by any combination of hard drive disks, solid state storage, random access memory (RAM), tape storage, distributed cloud storage, and so forth. However, the exact devices used to implement the unlabeled document database 302, labeled document database 303, classified document database 305, and verified document database 307 are not critical to the techniques described herein.

In some embodiments, the data stored in unlabeled document database 302, labeled document database 303, classified document database 305, and verified document database 307 adhere to a particular format or set of principles. For example, each of the aforementioned databases may be implemented as a relational database, object-relational database, flat file database, and so forth. The exact format and organization of the data stored within the unlabeled document database 302, labeled document database 303, classified document database 305, and verified document database 307 are not critical to the techniques described herein.

For the purpose of illustrating clear examples, it is assumed that the aforementioned databases store documents, each of which represents an instance of the problem domain. For example, the documents may include both structured (e.g. XML documents, HTML documents, Excel sheets, etc.) and unstructured data (e.g. medical reports, research papers, books, articles, etc.). However, in other embodiments, each document may contain multiple instances of the problem domain.

In an embodiment, the network 308 represents any combination of one or more local networks, wide area networks, internetworks, or service provider networks. Data exchanged over network 100 may be transferred using any number of network layer protocols, transportation layer protocols, and/or application layer protocols. In some embodiments, network 308 represents one or more interconnected internetworks such as the public Internet. In an embodiment, the classification computer 301, verification computer 304, and query computer 406 utilize the network 308 to exchange data.

In an embodiment, classification computer 301 represents a computing device that implements a machine learner ("classifier"). Depending on the embodiment, the classifier may be implemented via hardware, software, or a combination of hardware and software. For the purpose of illustrating clear examples, it is assumed that the classifier adheres to a supervised or semi-supervised learning model. For example, the classifier may utilize learning models including, but not limited to, support vector machine (SVM), naïve Bayes, neural network, Latent Dirichlet Allocation (LDA), Seam (Search and Learn), matrix factorization, ordinary least squares regression, weighted all pairs, contextual-bandit, and so forth. Thus, the classification computer 301 retrieves as input a labeled set of training documents from the labeled document database 303 and trains the classifier using the training documents.

However, depending on the classifier, the classification computer 301 may need to perform pre-processing to convert the training documents to a format understandable to the classifier. For example, the classification computer 301 may parse the documents into various linguistic structures, such as words, phrases, sentences paragraphs, and so forth. Furthermore, some classifiers require identification of features of the document on which to perform training. For example, a common representation of natural language documents used for this purpose is referred to as the "bag-of-words" model, where the order of the words is ignored and the frequency of each word is used as a feature input into the classifier. In still other cases, the classifier may require the features to be presented in a particular format, such as a table, where each row of the table corresponds to a different instance of the problem domain and the columns store the features and label of the instance. However, the exact representation of the training data is not critical to the techniques described herein and is context specific to the classifier implemented by the classification computer 301 and the problem domain.

The classification computer 301 trains the classifier on the set of training data obtained from the labeled document database 202 to determine a general rule that maps a document to an appropriate label. The classification computer 301 then uses the trained classifier to discover labels for a set of unlabeled documents obtained from the unlabeled document database 302. The classification computer 301, upon classifying the unlabeled document, updates the classified document database 305 with the results of the classification. For example, the classification computer 301 may store the classified document in the classified document database 305 along with the score of each potential label for the document considered by the classifier. The exact learning model utilized by the classification computer 301 is not critical to the techniques described herein. Furthermore, in other embodiments, the techniques described herein are applied to models related to unsupervised learning, such as k-means clustering, mixture models, hidden Markov models, and so forth, rather than supervised or semi-supervised learning.

In an embodiment, verification computer 304 represents a computing device that is configured to provide a user interface for verifying the labels provided by the classification computer 301. In some embodiments, the verification computer 304 retrieves as input a document and label stored by the classification computer 301 in the classified document database 305. The verification computer 304 then generates a user interface that displays data from the document and the results of the classification. For example, the user interface may display text from the document, as well as a table detailing the respective score of each potential label for the document. In the problem domain of identifying a target protein of a medical study, the labels may correspond to the different proteins discussed in the study, with the highest scoring protein representing the best predicted label of the classification computer 301. In addition, the user interface of the verification computer 304 provides one or more controls that are configured to receive input representing reviewer confirmation of the predicted label or input specifying an alternative label for the document. In an embodiment, the verification computer 304 tags the document with the verified label received via the aforementioned controls and stores the result in the verified document database 307. In some embodiments, as is described in herein, the verification computer 304 also feeds the result into the labeled document database 303 to assist with re-training the classifier implemented by the classification computer 301 to improve subsequent classifications.

In some embodiments, the verification computer 304 visually distinguishes, within the user interface, one or more linguistic structures (e.g. words, phrases, sentences, paragraphs, etc.) that relate to one or more of the potential labels from the remainder of the text. For example, using the previously mentioned problem domain, the name of each potential target protein may be highlighted in the displayed text of the document. Furthermore, the verification computer 304 may select one or more sections of the document to display in the user interface that are relevant to the classification. For example, the sections may be chosen based on hard coded rules (e.g. only display the abstract, conclusion, body, etc. of the document). As another example, the sections may be determined based on scores returned by the classifier of the classification computer 301. For example, the classification computer may provide a score for each label on a per document section basis. The sections of the document where the scores of the labels do not significantly differ may signify areas where little information relevant to the determining a label are located. Thus, the verification computer 304 may omit those sections from the display of the user interface for that document.

In an embodiment, the query computer 306 represents a computing device that is configured to provide a query user interface for searching documents in the verified document database 307. For example, the query computer 306 may index the documents in the verified document database 307 based on the verified label of each document. The query computer 306 then provides a query user interface which is configured to accept input representing selection of one or more labels.

In response to receiving the input representing selection of the one or more labels, the query computer 306 discovers documents in the verified document database 307 tagged with those labels and displays those documents in the query user interface. In some embodiments, the query computer 306 is configured to provide controls displayed alongside each of the discovered documents which, when selected, cause the full text of the document to be displayed within the query user interface.

Although FIG. 3 illustrates only a particular number of each depicted element in order to provide a clear example, a practical environment may possess many more, even hundreds or thousands, of each depicted element. In addition, although unlabeled document database 302, labeled document database 303, classified document database 305, and verified document database 307 are depicted as individual elements within FIG. 3, other embodiments may combine one or more of the aforementioned databases into a single database. For example, in another embodiment, the labeled document database 303 and the verified document database 307 may be combined to prevent redundant information from being stored by the classification system 300. Furthermore, the computer to which the aforementioned databases are communicatively coupled is not critical, in other embodiments the databases may be coupled to different computers, even a computer not explicitly depicted within FIG. 3. In addition, although classification computer 301, verification computer 304, and query computer 306 will each be described in reference to various features, the breakdown of responsibilities between the aforementioned computers is not critical. Thus, other embodiments may rearrange, combine, or divide out the discussed features among virtually any number of computers. For example, features of the verification computer 304 and the query computer 306 may be combined to form a computer capable of both providing a user interface to review and verify classifications as well as query verified documents.

4.0 Process Flow Overview

The following description presents method steps that may be implemented using computer-executable instructions, for directing operation of a device under processor control. The computer-executable instructions may be stored on a computer-readable storage medium, such as CD, DVD, hard disk, flash memory, or the like. The computer-executable instructions may also be stored as a set of downloadable computer-executable instructions, for example, for downloading and installation from an Internet location (e.g., a Web server).

Figure 4:
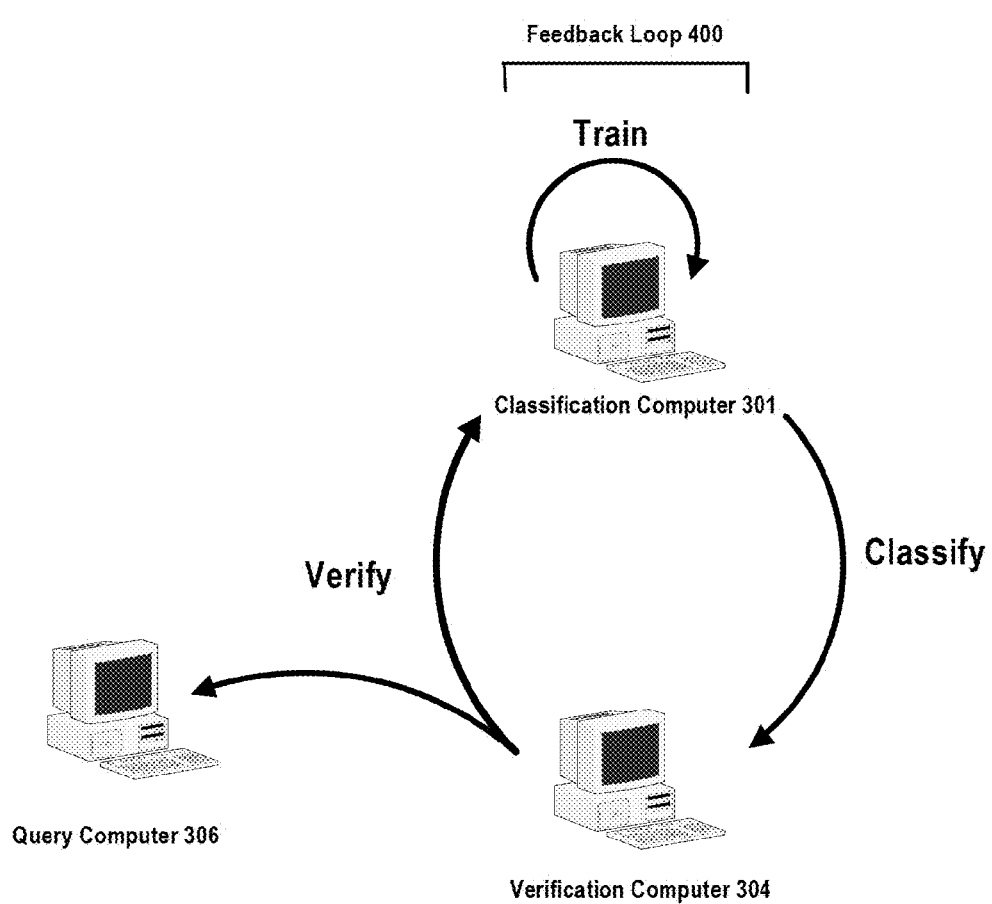
FIG. 4 illustrates an overview of an example process flow for a classification system according to an embodiment.

FIG. 4 illustrates an overview of an example process flow between the classification computer 301, verification computer 304, and query computer 306.

In FIG. 4, the classification computer 301 trains a classifier based on a set of training documents retrieved from the labeled document database 303. After training is complete, the classification computer 301 iterates over unlabeled documents from the unlabeled document database 303 and uses the trained classifier to determine a label for those documents. The documents classified by the classification computer 301 are then exported to the classified document database 305. The verification computer 304 retrieves classified documents from the classified document database 305 and generates a user interface that provides an option to verify the label predicted by the classification computer 301 or provide an alternative label.

In some embodiments, the verification computer 304 displays data from the classified documents in a manner that directs attention to the portions of the classified documents that impacted the decision process of the classification computer 301 when assigning labels. For example, key words or phrases associated with the potential labels may be highlighted. As another example, portions of text from the document may be omitted if the impact from those sections on the classification is below a particular threshold.

Upon receiving a verified label for the document from the user interface, the verification computer 304 exports the verified document to the verified document database 307, where the verified document is made available to queries from the query computer 306. In addition, the verification computer 304 feeds the verified document into the labeled document database 303 to allow the classification computer 301 to retrain and improve future classifications.

Thus, process flow includes a feedback loop 400 that involves training the classifier, classifying an unlabeled document using the trained classifier, verifying the label provided by the trained classifier, and retraining the classifier based on the verified label.

5.0 Classification Computer Process Flow

Figure 5:
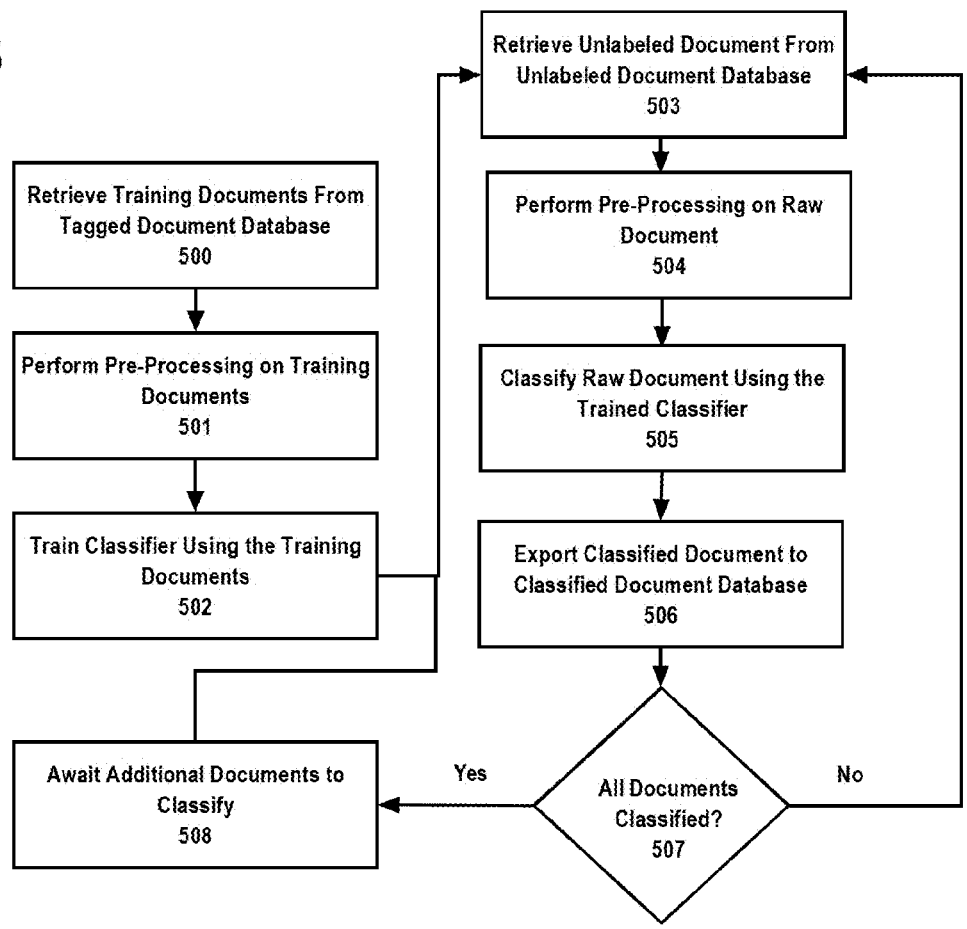
FIG. 5 illustrates an example process flow for a classification computer in block diagram form according to an embodiment.

FIG. 5 illustrates a process flow for the classification computer 301 in block diagram form according to an embodiment. Many of the examples in the following discussion will assume that the problem domain relates to identifying the target protein of a medical drug study. The aforementioned examples will also assume that the classification computer 301 utilizes a binary classifier that returns whether or not a protein is the target protein of the study. Thus, the labels accepted and produced by the binary classifier are either "STUDY TARGET" or "NOT STUDY TARGET". However, for these examples, it is assumed that each of the documents used for training is labeled with the target protein of the study. As a result, pre-processing is performed to convert the labeled training documents into examples adhering to the labels accepted by the classifier.

For ease of understanding example embodiments, labels relating to the documents are referred to herein as "document labels" and labels relating to the training examples and outputs of the classifier are referred to herein as "classifier labels". However, these examples relate to only one of almost innumerable permutations of problem domains and classifiers that are applicable to the techniques discussed herein. In many other embodiments, the document labels and the classifier labels will, in fact, be identical. In other embodiments, virtually any type of problem domain and/or classifier (including multi-class classifiers) may be used in conjunction with the techniques discussed herein.

At block 500, the classification computer 301 retrieves a set of training documents from the labeled document database 303. In an embodiment, each document in the set of training documents represents a medical study that has targeted a particular protein, which is specified by the corresponding document label. In some embodiments, the classification computer 301 retrieves all of the documents contained within the labeled document database 303 to use for training the classifier. However, in other embodiments, the classification computer 301 may retrieve only a subset of the documents contained within the labeled document database 303 for this purpose. For example, the classification computer 301 may retrieve documents to include in the training set which have document labels belonging to a distribution that approximates the distribution of the document labels in the problem domain.

At block 501, the classification computer 301 performs pre-processing on the set of training documents. In some embodiments, depending on the classifier utilized by the classification computer 301 and the problem domain, the set of training documents may need to be transformed into a format that the classifier is capable of understanding. For example, the classifier may require training examples to be in a particular format, identification of features in the documents on which to base the classification, parsing/identification of linguistic structures (e.g. words, phrases, sentences, paragraphs, etc.), removal of outliers, filtering of documents missing critical fields and/or data, transformation of the labels associated with the documents to those utilized by the classifier, and so forth. The pre-processing performed at block 501 may vary from implementation to implementation depending on the requirements of the particular implementation at hand. For example, the pre-processing performed at block 501 may depend on the particular classifier used by classification computer 301 and the particular problem domain.

In an embodiment, the classification computer 301, during pre-processing, constructs positive training examples representing cases in which a protein is the target and negative examples representing cases in which a protein is not the target. Thus, converting the training documents associated with individual target proteins into training examples which generalize that concept to a protein being a target of a study or not being a target of the study.

One reason that the classifier may be implemented as a binary classifier for this situation, as opposed to a multi-class classifier, is that there may not be enough examples of documents associated with each target protein to effectively train a multi-class classifier. For example, a multi-class classifier may be trained to accept input representing features of the document and output a specific protein that is the target. However, to train the multi-class classifier, there would need to be a significant number of training documents associated with each protein that the classifier is expected to encounter when classifying unlabeled documents. If the classifier were to encounter a document relating to a protein that had not been encountered during training or for which the classifier had insufficient examples, the likelihood of an incorrect label being assigned is significant. This requirement can be alleviated by recognizing that the sentence structure and other features of the document that would signify that a protein is a target is likely to be consistent, regardless of the exact target protein. As a result, in the following example, each training document is broken down into positive and negative training examples by replacing the target protein and other (auxiliary) proteins mentioned in the documents with placeholder identifiers. Those placeholder identifiers then allow the classifier to train and evaluate, on a per-protein basis, the likelihood that a particular protein is the target.

At a first sub-step, the classification computer 301 retrieves a document from the set of training documents.

At a second sub-step, the classification computer 301 parses the training documents into linguistic structures, such as sentences, phrases, paragraphs, and so forth.

At a third sub-step, the classification computer 301 identifies, for each linguistic structure, the proteins mentioned in the linguistic structure. For example, the classification computer 301 may utilize a list or table of names that identify known proteins. As another example, the classification computer 301 may utilize a set of syntactic rules that identify protein names based on the underlying pattern of the linguistic structure. The exact methodology used to identify the proteins is not critical.

At a fourth sub-step, the classification computer 301 normalizes the keywords. For example, a single protein may have multiple accepted names in the scientific community. Thus, the classification computer 301 may select one name to represent the protein and replace other identifiers of the protein with the selected name.

At a fifth sub-step, for each linguistic structure parsed at the second sub-step, the classification computer 301 generates a positive training example and one or more negative training examples by replacing the identified proteins in the sentence with placeholder identifiers.

For example, consider the sentence "The drug inhibits BRAF, but also activates MEK1, which in turn activates ERK2". In this sentence, the identified proteins are "BRAF", "MEK1", and "ERK2". Assume that the label indicates the target protein is "BRAF". The classification computer 301 generates a positive example by replacing instances of "BRAF" (the labeled protein) with the placeholder identifier "TARGET". Furthermore, the non-target proteins, "MEK1" and "ERK2" are replaced with the placeholder "AUX". Thus, the positive training example becomes "The drug inhibits TARGET, but also activates AUX, which in turn activates AUX", which is marked as a case where the identifier TARGET is actually the target of the study. To generate negative training examples, the classification computer 301, for each of the non-target proteins, replaces the non-target protein with the identifier "TARGET" and the other proteins with "AUX". For example, for protein MEK1, the negative training example generated would be "The drug inhibits AUX, but also activates TARGET, which in turn activates AUX", which is marked as a case where TARGET is not the target of the study. Thus, at the end of the fifth sub-step, the linguistic structures have been converted into a collection of positive training examples and negative training examples.

At a sixth sub-step, the classification computer 301 identifies one or more features of the training examples that are utilized by the classifier during training. For instance, consider the previously recited positive example, "The drug inhibits TARGET, but also activates AUX, which in turn activates AUX". In one embodiment, the classification computer 301 applies the bag-of-words model to identify the features of the training example. In the bag-of-words only the frequency of words is taken into consideration, but not the order of the words. Thus, the positive example may be represented as a row of a table, where all but one column store the features which, in this case, are the relative frequencies of the different words and a final column that indicates whether the features belong to a positive ("STUDY TARGET") or negative ("NOT STUDY TARGET") example.

In some embodiments, the bag-of-words model can be modified to use abstractions of the words, such as replacing the words with their corresponding part-of-speech, before identifying the relative frequencies. However, one limitation of the bag-of-words model is that information related to the order of the words is lost as a feature available to the classifier. Thus, in other embodiments, the classification computer 301 identifies features related to "n-grams", which are contiguous sequences of n items (e.g. syllables, words, phrases, sentences, and so forth) from a given sequence of text or speech. As a result, by utilizing "n-grams" at least some information regarding the word-order is presented as a feature to the classifier. However, the bag-of-words model and the n-gram model are only examples of feature identification that can be applied to linguistic structures. Other techniques for identifying features are equally as applicable. Thus, at the end of the sixth sub-step, the classification computer 301 has identified, for each training example, one or more features and a label indicating whether the example is positive ("STUDY TARGET") or negative ("NOT STUDY TARGET").

At block 502, the classification computer 301 trains the classifier using the set of training documents. As mentioned earlier, the classification computer 301 may utilize any number of different types of classifiers, each of which trains using different techniques. Thus, the training process will differ greatly depending on the classifier utilized by the classification computer 301. In an embodiment, continuing from the previous example, the positive and negative examples are fed into the classifier which determines a general rule (e.g. via neural network, SVM, matrix factorization, ordinary least squares regression, or any other learning technique) that maps features to a corresponding label ("STUDY TARGET" or "NOT STUDY TARGET").

At block 503, the classification computer 301 retrieves an unlabeled document from the unlabeled document database 302.

At block 504, the classification computer 301 performs pre-processing on the unlabeled document. In an embodiment, the classification computer 301 performs the same pre-processing discussed above with respect to block 501. For instance, expanding on the previous example, the classification computer 301 may perform sub-steps similar sub-steps discussed above in reference to block 501. However, since the label of the document is unknown, the classification computer 301 creates multiple examples, each of which assumes a different protein is the target protein. Thus, for each linguistic structure parsed out from the document, the classification computer 301 iterates over each identified protein creating examples where that protein is replaced with TARGET and the other proteins are replaced with AUX. The result being that for each linguistic structure, an example is created for each protein to test the likelihood that the protein is the target protein. Features are then extracted from the examples using the same feature extraction technique utilized at block 501.

At block 505, the classification computer 301 classifies the unlabeled document using the trained classifier. In an embodiment, building upon the previous example, the classification computer 301 uses the binary classifier to determine a label ("STUDY TARGET" or "NOT STUDY TARGET") for each protein for each linguistic structure. In an embodiment, for each protein, a score is assigned to each linguistic structure based on the determination that is then accumulated across the linguistic structures of the document. This accumulated score represents the classifier's confidence that a particular protein is the target protein discussed in the document. Thus, the protein with the highest accumulated score represents the predicted label for the document. In many cases, classifiers are designed to provide not just a classifier label, but also a score or probability associated with that classifier label. Thus, for each protein, the score assigned to each linguistic structure may be provided by the classifier itself, which is then accumulated across the entire document. However, in other embodiments specific scores or weights may be assigned to each outcome, such as ("STUDY TARGET=+1, NOT STUDY TARGET=−1). Thus, in an embodiment, at the end of block 505, the classification computer 301 has access to a score for each protein discussed in the document that indicates the likelihood that the protein is the target protein.

In some embodiments, the classification computer 301, when accumulating the scores across the linguistic structures, may also maintain scores for various sections or portions of the document. For example, if the linguistic structure is a sentence, the classification computer 301 may keep track of the scores for each sentence, scores accumulated for each paragraph, scores accumulated for each section, and so forth. Thus, the classification computer 301 may keep track of the scores over various portions of the document.

In some embodiments, scores associated with different portions of the document are assigned different weights. For example, scores of training examples derived from the abstract may be multiplied by a different factor than training examples derived from other sections of the document. Thus, portions of the document assigned to higher weights are emphasized more during aggregation and more greatly impact the result of the classification.

At block 506, the classification computer 301 exports the document classified at block 505 and the label information to the classified document database 305. For convenience, a document that has been associated with a label by the classification computer 301 is referred to as a "classified document". In an embodiment, the classification computer 301 accesses the classified document database 305 over network 308 to upload the classified document and the label information. In other embodiments, the classification computer 301 sends the classified document and the label information over network 308 to verification computer 304, which then assumes responsibility for inserting the new data into the classified document database 305.

At block 507, the classification computer 301 determines whether all the unlabeled documents have been classified. In an embodiment, the classification computer 301 removes a document from the unlabeled document database 303 once classification of the document is complete. Thus, the classification computer 301 determines that all the unlabeled documents have been classified once the unlabeled document database 303 has been emptied. However, in other embodiments, the classification computer 301 stores each document with a flag that indicates whether or not the document has already been classified. Thus, the classification computer 301 determines whether all the unlabeled documents have been classified based on whether unflagged documents exist within the unlabeled document database 303.

In response to a determination that all unlabeled documents have been classified, the classification computer 301 proceeds to block 508, where the classification computer 301 awaits for additional unlabeled documents to be added to the unlabeled document database 303. For example, the classification computer 301 (or another computer) may execute a web service that is configured to accept document submissions from one or more client computers or workstations. As another example, the classification computer 301 (or another computer) executes a web crawler that searches the Internet for appropriate documents and imports those documents into the unlabeled document database 303. Otherwise, the classification computer 301 returns to block 503 to retrieve another unlabeled document to classify.

6.0 Verification Computer Process Flow

Figure 6:
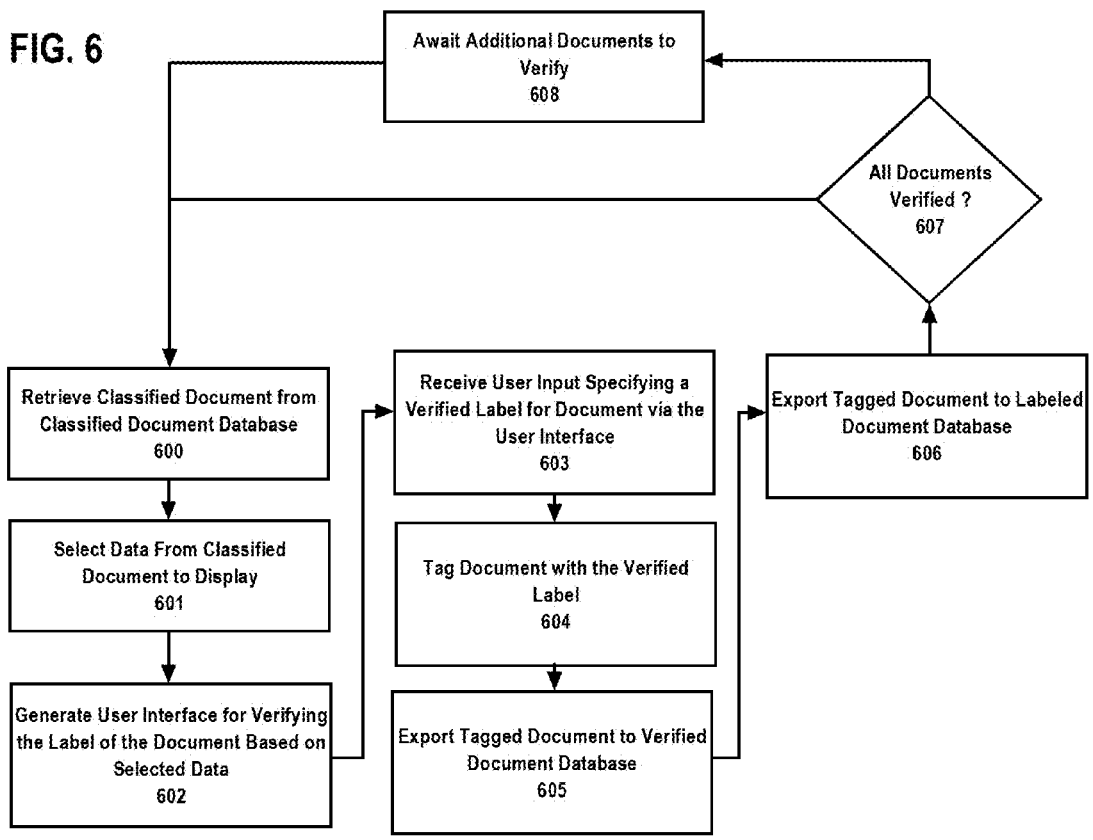
FIG. 6 illustrates an example process flow for a verification computer in block diagram form according to an embodiment.

FIG. 6 illustrates an example process flow for a verification computer in block diagram form according to an embodiment.

At block 600, the verification computer 304 retrieves a classified document from the classified document database 305. In some embodiments, the classified document is tagged only with the highest scoring predicted label generated by the classification computer 301. However, in other embodiments, the classified document is stored in the classified document database 305 along with each potential label and corresponding score considered by the classification computer 301. Thus, at block 600, the verification computer 304 may retrieve not only data from the classified document, but also data identifying the potential labels and a corresponding score for each label. Furthermore, in some embodiments, the score for each potential label is stored in the classified document database 305 at varying levels of granularity. Thus, a score for each potential label may be stored for each sentence, phrase, paragraph, section, or any other breakdown of the document.

In some embodiments, the verification computer 304 applies one or more criteria to the classified documents in the classified document database 305 to determine the order that the documents are verified. For example, the verification computer 304 may select the documents for which the top scoring label differs least from the next highest scoring label. Thus, the verification computer 304 prioritizes cases where there is the strongest probability of confusion between labels.

In other embodiments, the verification computer 304 the one or more criteria to filter the documents selected for verification. For example, only documents where the top scoring label differs at least a threshold amount from the next highest scoring label may be selected for verification. Thus, limiting the number of documents presented for verification to a smaller subset in order to focus reviewer attention only the cases with a significant probability of misclassification. In such embodiments, the verification computer 304 exports the classified documents which are above the threshold to the verified document database 307 without proceeding through the remaining blocks of FIG. 6 and treating the top scoring label for that document as verified.

At block 601, the verification computer 304 selects data from the classified document to display. In some embodiments, the verification computer 304 selects all of the data from the document to display. However, in other embodiments, the verification computer 304 stores a set of rules that dictate which data is to be displayed. For example, the set of rules may specify that only certain sections (e.g. abstract, conclusion, etc.) are assumed to contain information important to determining the classification and are selected for display. As another example, the set of rules may specify that only portions of the document where the scores of the potential classifications differ by a threshold amount are to be displayed. Since the score relates to the classifier's confidence that the corresponding classification is correct, portions in which the scores are nearly identical may represent areas in the document where little to no information useful to determining a label is located. Thus, according to an embodiment, those areas are not selected for display to narrow down the information presented to the reviewer to only those areas important for classification. The scores may be tallied for this purpose across various granularities of the document, such as for each sentence, phrase, paragraph, section, and so forth.

At block 602, the verification computer 304 generates a user interface that displays the selected data from the classified document and provides one or more controls which, upon selection, cause the classification computer 301 to receive a verified label for the classified document. For example, the user interface may display text representing the selected data from the classified document and one or more controls (e.g. drop down menus, scroll bars, buttons, forms, checkmark boxes, or other user interface elements) allowing selection of a verified label for the classified document. For instance, assuming the controls represent a drop down menu, the options of the dropdown menu may be generated by the verification computer 304 based on a set of potential classifications and/or corresponding scores stored in association with the classified document. Thus, the labels may be displayed in the dropdown menu ordered from highest to lowest score, representing a descending order of confidence that the classification computer 301 held with respect to that label.

At block 603, the classification computer 301 receives input specifying a verified label for the document via the user interface. For example, the classification computer 301 may receive a verified label via selection of a particular option corresponding to the verified label from a dropdown menu, scroll wheel, set of buttons, open form or other user interface elements. In some embodiments, the user interface is configured to accept additional information specifying data from the document that was critical to the reviewer during the verification process. For example, the user interface may be configured to accept mouse input to highlight one or more sentences, or other linguistic structures, within the displayed data from the document. The highlighted portions are then accepted by the classification computer 301 as the additional data.

At block 604, the classification computer 301 tags (or otherwise associates) the document with the verified label. In some embodiments, the classification computer 301 stores the tag within the classified document. However, in other embodiments, the verified label is maintained as metadata associated with the classified document. Furthermore, in embodiments where additional information is provided at block 603, the document is also associated with the additional information at block 604. For convenience, a document that has been tagged with a verified label is referred to as a "verified document".

At block 605, the classification computer 301 exports the verified document to the verified document database 307. In an embodiment, in response to the classification computer 301 exporting the verified document to the verified document database 307, the query computer 306 indexes the verified document for subsequent queries.

At block 606, the classification computer 301 exports the verified document to the labeled document database 303. In an embodiment, exported verified document is then used by the classification computer 301 to retrain and improve the results of future classifications.

In some embodiments, the classification computer 301, in response to detecting that a new document has been added to the labeled document database 303, repeats the training described above with respect to blocks 500, 501, and 502 of FIG. 5 before classifying further documents. However, in other embodiments, the classification computer 301 perform retraining in batches, waiting until a threshold number of documents and/or a threshold period of time has passed since training was last performed to initiate retraining. In still other embodiments, the classification computer 301 waits to initiate retraining until a period of downtime is detected in which the number of pending documents to be classified is below a particular threshold or during regularly scheduled maintenance.

In some embodiments, in cases where additional information is received at block 603, the classification computer 301 takes the additional information into account during retraining. For example, assuming the classification computer 301 provides scores on a per-sentence basis, the scores corresponding to highlighted sentences may be weighted more highly during accumulation of the scores across the document, as described above in reference to block 505 of FIG. 5.

In other embodiments, depending on the classifier utilized by the classification computer 301, the data points or training examples derived from those sentences may be weighted to more strongly pull other data points towards that classification. For example, assuming the classifier is a SVM, the established boundaries between the data points may be modified, such that boundaries around data points derived from highlighted sentences bulge outwards to cover a larger feature space. Furthermore, assuming the classifier is based on regression, larger weights may be provided to data points derived from the highlighted sentences, such that the resulting function is drawn more towards those data points than data points corresponding to non-highlighted sentences.

At block 607, the verification computer 304 determines whether there are still documents in the verified document database 307 that require verification. In response to a determination that one or more documents still require verification, the verification computer 304 proceeds back to block 600 and selects another classified document to verify. Otherwise, the verification computer 304 proceeds to block 608, where the verification computer 304 awaits additional classified documents to be inserted into the classified document database 305. For example, the verification computer 304 may wait for the classification computer 301 to insert additional documents into the classified document database 305. In response to a determination that new classified documents are available in the classified document database 305, the verification computer 304 proceeds back to block 600 and selects another classified document to verify.

7.0 Example User Interface for Verification

Figure 7:
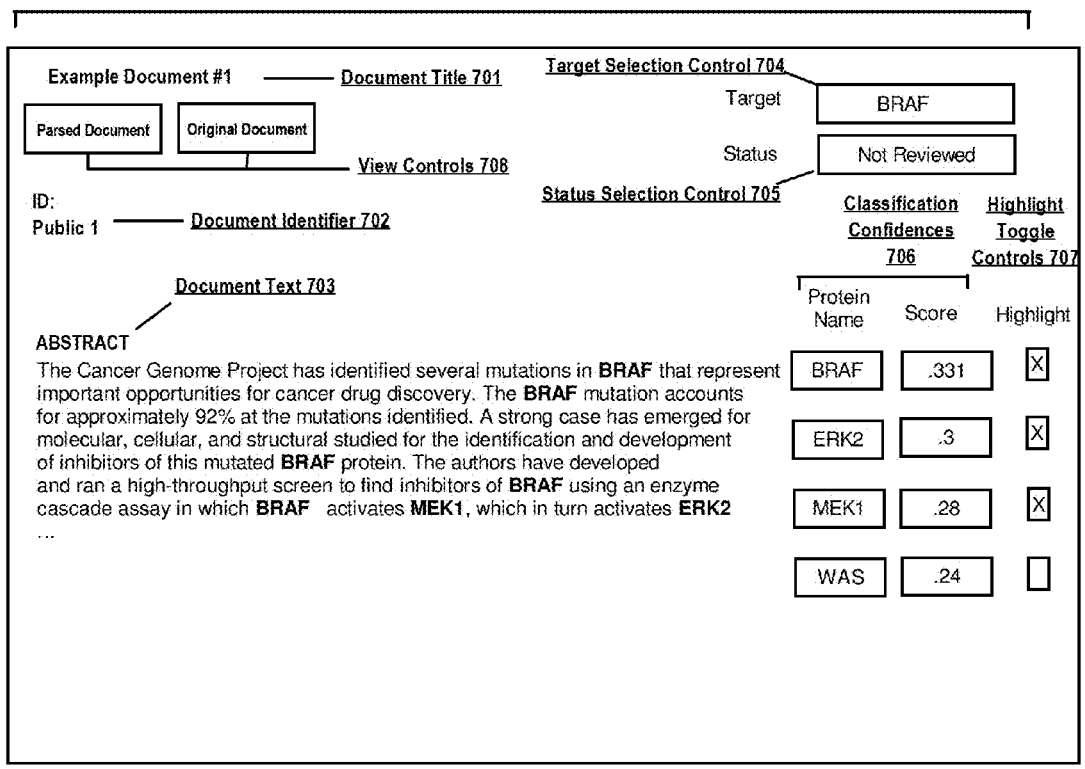
FIG. 7 illustrates an example user interface for verifying a label of a document according to an embodiment.

FIG. 7 illustrates an example user interface for verifying a label of a document according to an embodiment. In order to illustrate a clear example, it will be assumed that FIG. 7 represents a user interface generated by the verification computer 304 at block 602 of FIG. 6.

In FIG. 7, user interface 700 represents a graphical display which displays data from a classified document and a collection of controls that modify the display or allow selection of a verified label for the classified document. In some embodiments, user interface 700 is displayed by the verification computer 304. However, in other embodiments, the user interface 700 may be generated by the verification computer 304, but is then sent over network 308 to a client computer (not depicted in FIG. 3) for the client computer to display. For example, user interface 700 may represent a web-interface that is implemented by code written in languages such as, Hyper Text Markup Language (HTML), Java, JavaScript, and so forth which, when received and executed by the client computer, causes the client computer to display the user interface 700 of FIG. 7.

In an embodiment, document title 701 represents an area of the user interface 700 where the title of the classified document is displayed. In an embodiment, the classification computer 301 retrieves the document title 701 by parsing text of the classified document and identifying the title through linguistic analysis. However, in other embodiments, the title may be stored as metadata associated with the classification document which is retrieved by the verification computer 304 to populate the document title 701.

In an embodiment, view controls 708 represent controls within the user interface 700 which, when selected, toggle between different views of the classified document. For example, the view controls 708 may include a button which, when selected, causes the user interface 700 to display only the portions of the classified document selected at block 601 of FIG. 6. Furthermore, the view controls 708 may also include a button which, when selected, causes the user interface 700 to display the full text of the classified document. In other embodiments, the view controls 708 also provide an option to view documents in a structured or unstructured form. For example, the classified document may represent a structured document, such as an Extensible Markup language (XML) document. While XML is a convenient format for computer processing, a reviewer may find the structure of the XML document difficult to read. Thus, the view controls 708 may include a button for viewing a parsed version of the classified document, as well as another button for viewing the original format of the classified document.

In an embodiment, document identifier 702 represents an area of the user interface 700 that displays an identifier of the classified document. For example, the document identifier 702 may be a number, word, phrase, or other identifier type that uniquely identifies the classified document. As another example, the document identifier 702 may indicate additional information regarding the classified document, such a location or source from which the document originated, whether the document is public or private, whether the document belongs to a collection or set, an author of the document, and so forth.

In an embodiment, document text 703 represents an area of the user interface 700 where data from the classified document is displayed. For example, depending on the current selection of the view controls 708, the document text 703 may include the full text of the document, parsed text of the document, select portions of the document, and so forth. In an embodiment, the document text 703 is populated based on extracting data from the classified document retrieved from the classified document database 305. In some embodiments, the document text 703 is displayed along with a user interface element that is configured to allow selection of one or more portions or linguistic structures of the document text 703. For example, the user interface element, when selected by a pointing device, may replace the cursor with an icon depicting a highlighter. Thus, in response to input indicating a selection and dragging motion by the pointing device, the verification computer 304 highlights areas of the document text 703 corresponding to the area covered by the cursor. In an embodiment, the highlighted portions of the document text 703 become the additional information discussed above in reference to step block 603 of FIG. 6.

In an embodiment, target selection control 704 represents an element of the user interface 700 which is configured to accept a selection of a verified label for the classified document. For example, the target selection control 704 may be implemented by a form, dropdown menu, radio buttons, scrollable list, or any other conceivable type of user interface element. In embodiments which utilize a user interface element which is configured to allow selection from a set of potential labels, as opposed to a free-form text, the verification computer 304 derives the potential labels from the scoring data stored with the classified document. However, in other embodiments, the verification computer 403 can instead derive the potential labels by parsing the classified document and identifying labels based a table or keywords or linguistic patterns. For embodiments which accept free-form text, the verification computer 304 may implement an auto-completion technique to recommend labels based on a sub-string entered into the target selection control 704.

In an embodiment, status selection control 705 represents an element of the user interface 700 which is configured to accept selection of a status for the classified document. For example, the status selection control 705 may represent radio buttons, a dropdown menu, a submit button, a form, or other user interface element that accepts input related to whether review of the classified document is complete.

In an embodiment, in response to receiving input selecting that review of the classified document is complete, the classification computer 301 considers the current selection of the target selection control 704 as final and proceeds from block 602 of FIG. 6 to block 603 of FIG. 6. However, in other embodiments, selection of a status via the status selection control 705 does not trigger completion of the review process. For example, a separate submit button (or other user interface element) may be employed to trigger the verification computer 304 to proceed from block 602 to block 603.

In some embodiments, the verification computer 304 saves the current status of the user interface 700 in cases where the review is only partially completed and restores the user interface 700 for the classified document to its last saved state at a later time. For example, the user interface 700 may include a "save and submit later" button, which causes the verification computer 304 to save the current state of the user interface 700 for re-display at a later time. For instance, the verification computer 304 may re-display the last saved state of the user interface 700, in response to the reviewer logging back into the verification computer 304 or receiving input indicating that the reviewer is ready to proceed.

In an embodiment, the classification confidences 706 represent an area of the user interface 700 where the potential labels and their respective scores are displayed. For example, the potential labels considered by the classification computer 301 and the respective score of each label may be stored within the classified document or stored as metadata associated with the classified document.

In an embodiment, the classification confidences 706 are displayed in an order based on the score of each potential label. For example, the labels may be presented in order of decreasing confidence.

In an embodiment, highlight toggle controls 707 represent one or more user interface elements that control display of linguistic structures associated with the potential labels of the classification confidences 706 within the document text 703. For example, the highlight toggle controls 707 may represent checkmark boxes, radio buttons, or other user interface elements configured to allow toggling of the manner in which the corresponding linguistic structures are displayed.

In an embodiment, the linguistic structures associated with each of the highlight toggle controls 707 is determined based on a table that maps linguistic structures (e.g. words, phrases, sentences, etc.) to each respective potential label. For example, in the problem domain of determining a target protein, each potential target protein may be mapped to the various names used to refer to that protein within the scientific community. However, in other embodiments, the verification computer 304 stores syntactic rules associated with each potential label to identify linguistic structures within the document text 703 which correspond to each potential label. In addition, combinations of the aforementioned techniques could also be employed by the verification computer 304 to identify the corresponding linguistic structures. In an embodiment, when a particular control of the highlight toggle controls 707 is selected, the corresponding linguistic structures in the document text 703 toggle between different visual modes. For example, the corresponding linguistic structures may toggle between highlighted and not highlighted, bolded and not bolded, different colors, or any other mechanism that visually distinguishes the linguistic structures within the document text 703.

8.0 Query Computer Process Flow

Figure 8:
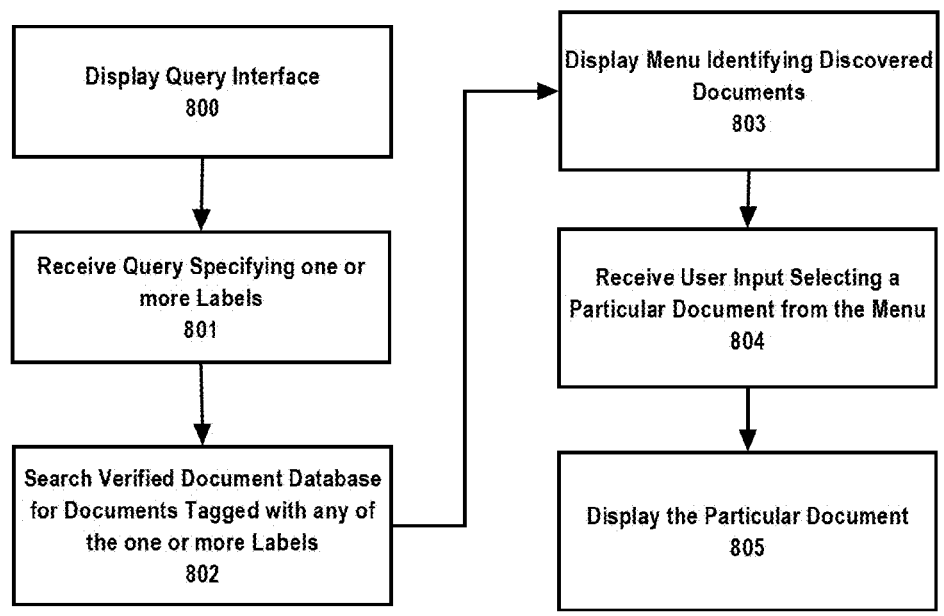
FIG. 8 illustrates an example process flow for a query computer in block diagram form according to an embodiment.

FIG. 8 illustrates an example process flow for a query computer in block diagram form according to an embodiment.

At block 800, the query computer 306 generates a query user interface that includes one or more query controls for specifying one or more labels. For example, the query computer 306 may generate the query user interface as a web interface implemented by code (e.g. HTML, Java, JavaScript, etc.) that is sent across network 308 to a client computer (not depicted in FIG. 3). The client computer then executes the code, which results in the client computer displaying the web interface. However, in other embodiments, the query computer 306 both generates and displays the query user interface. In an embodiment, the one or more query controls for specifying one or more labels takes the form of one or more user interface elements, including but not limited to radio buttons, forms, buttons, drop-down menus, checkmark boxes, and so forth. For example, the query computer 306 may store a list or other data structure as metadata in the verified document database 307 that identifies all the classifications with which the verified documents have been tagged. Thus, the query computer 306 can populate the options provided by the one or more query controls based on the identified classifications.

At block 801, the query computer 306 receives a query specifying one or more labels via the one or more query controls of the query user interface. For example, the query computer 306 may receive the one or more labels based receiving the labels as text via a form, selection of checkmark boxes associated with the one or more labels, selection of radio buttons corresponding to the one or more classifications, and so forth. As another example, assuming the problem domain is discovering the target protein of medical studies, the options provided via the one or more query controls may correspond to the different proteins that have been identified as target proteins for the verified documents stored in the verified document database 307.

In some embodiments, for text input, the query computer 306 stores a table (or other data structure) indicating keywords, identifiers, or phrases that map to the same label and identifies the one or more labels based on the keywords. For example, if a target protein is associated with multiple names, entering any of the names may map to the same label used in the query.

At block 802, the query computer 306 searches the verified document database 307 for documents which have been tagged with a verified classification matching any of the one or more labels.

In an embodiment, when a document is placed in the verified document database 307, the query computer 306 updates an index that allows efficient searching for documents based on the associated verified label. For example, assuming the verified document database 307 is implemented as a relational database, the query computer 306 may store a metadata index for each label that holds pointers that link to rows representing the different documents that are tagged with the label. However, the exact technique used to search the verified document database 307 is not critical.

In some embodiments, the query computer 306 ranks the documents discovered during the search based on one or more criteria. For example, the query computer 306 may rank each document based on the score for the verified label assigned by the classification computer 301 for the document.

At block 803, the query computer 306 displays a menu identifying the documents found as a result of the search at block 802. For example, the query computer 306 may display a menu via the query user interface that identifies the title, author, tags, excerpt of the text, abstract, identification number, or any other characteristics of the identified documents. In some embodiments, the menu displayed at block 803 includes one or more controls for selecting one of the identified documents. For example, each document may be displayed in the menu with a user interface element, such as a button, that allows the document to be selected. However, in other embodiments, in instead of or in addition to the menu, the query computer 306 may display an initial document along with controls for iterating through the documents discovered at block 802.

At block 804, the query computer 306 receives input selecting a document from the documents discovered at block 802. In an embodiment, the query computer 306 receives the selection via the menu discussed in relation to block 803.

At block 805, the query computer 306 causes display of the selected document in the query user interface. For example, if the query computer 306 itself displays the query user interface, the query computer 306 may retrieve data from the selected document stored in the verified document database 307 to display. As another example, if a client computer is displaying the query user interface, the query computer 306 may retrieve data from the selected document and send that data over network 308 to the client computer for display. In an embodiment, the display of the selected document includes the full text of the selected document. However, in other embodiments, the display of the selected document may include only a portion of the selected documents with additional controls to switch to a view of the full text.

9.0 Extensions and Alternatives

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the present invention.

The invention claimed is:

1. A method comprising:
    obtaining a document;
    determining, using a trained classifier, a candidate label for the document from a plurality of different labels;
    selecting two or more different linguistic structures from the document;
    displaying a user interface that presents data from the document, including at least a portion of the two or more linguistic structures, and the plurality of labels including the candidate label, and respective scores in association with each different label among the plurality of labels, wherein the portion of the two or more linguistic structures are displayed by the user interface, wherein the user interface includes two or more user interface controls which present a first option to accept the candidate label for the document and a second option to select a different label for the document, the two or more user interface controls further presenting an element for highlighting the two or more linguistic structures within the document;
    wherein one of the user interface controls is configured to allow selection from the plurality of different labels;
    receiving, via the two or more user interface controls, input representing selection of the first option or the second option, and further input comprising a highlighted section of the two or more linguistic structures that was important to the selection of the first option or the second option;
    associating the document with a verified label;
    changing, based on the further input, one or more weights assigned to the highlighted section relative to a non-highlighted section during retraining of the trained classifier;
    wherein the method is performed by one or more computing devices.

2. The method of claim 1, wherein the trained classifier has been trained using a set of labeled documents, the verified label is the candidate label if the first option is selected by the input, and the verified label is the different label if the second option is selected by the input, and further comprising:
    adding the document and the verified label to the set of labeled documents;
    retraining the trained classifier based on the set of labeled documents to which the document and the verified label have been added.

3. The method of claim 1, wherein determining, using the trained classifier, the candidate label for the document includes at least:
    receiving, from the trained classifier, a particular respective score for each different label of the plurality of labels, wherein the particular respective score represents a confidence of the trained classifier with respect to the label being correct for the document.

4. The method of claim 3, wherein the trained classifier determines the respective score for each classification by at least:
    determining, for each document portion of a plurality of document portions of the document, a respective sub-score for the document portion;
    determining the particular respective score of the document based on aggregating the respective sub-score for each document portion of the plurality of document portions.

5. The method of claim 4, further comprising:
    assigning, to each document portion of the plurality of document portions a respective weight, wherein the sub-score for each document portion of the plurality of document portions is weighted by the respective weight for the document portion when aggregating the respective sub-score for each document portion of the plurality of document portions.

6. The method of claim 4, further comprising:
    selecting one or more document portions of the plurality of document portions of the document to include in the data based on the respective sub-score of each document portion of the plurality of document portions.

7. The method of claim 1, wherein the document represents a medical report that discuss a respective target protein of a plurality of proteins and each label of the plurality of labels relates to at least one protein of the plurality of proteins.

8. The method of claim 1, wherein each linguistic structure of the one or more linguistic structures is associated with at least one label of the plurality of labels, the two or more linguistic structures are displayed by the user interface in a visually distinguished manner compared to other two or more linguistic structures displayed by the user interface, and the user interface includes second two or more user interface controls associated with the plurality of labels and which, when selected, each cause toggling of the visually distinguished manner of one or more respective linguistic structures, of the portion of the two or more linguistic structures displayed by the user interface, that are associated with a respective label of the plurality of labels.

9. A non-transitory computer-readable storage medium storing one or more instructions which, when executed by one or more processors, cause the one or more processors to perform steps comprising:
    obtaining a document;
    determining, using a trained classifier, a candidate label for the document from a plurality of different labels;
    selecting two or more different linguistic structures from the document;

displaying a user interface that presents data from the document, including at least a portion of the two or more linguistic structures, the plurality of labels including the candidate label and respective scores in association with each different label among the plurality of labels, wherein the portion of the two or more linguistic structures are displayed by the user interface, wherein the user interface includes two or more user interface controls which present a first option to accept the candidate label for the document and a second option to select a different label for the document, the two or more user interface controls further presenting an element for highlighting the two or more linguistic structures within the document;

receiving, via the two or more user interface controls, input representing selection of the first option or the second option, and further input comprising a highlighted section of the two or more linguistic structures that was important to the selection of the first option or the second option;

associating the document with a verified label;

changing, based on the further input, one or more weights assigned to the highlighted section relative to a non-highlighted section during retraining of the trained classifier.

10. The non-transitory computer-readable storage medium of claim 9, wherein the trained classifier has been trained using a set of labeled documents, the verified label is the candidate label if the first option is selected by the input, and the verified label is the different label if the second option is selected by the input, and the steps further comprise:

adding the document and the verified label to the set of labeled documents;

retraining the trained classifier based on the set of labeled documents to which the document and the verified label have been added.

11. The non-transitory computer-readable storage medium of claim 9, wherein determining, using the trained classifier, the candidate label for the document includes at least:

receiving, from the trained classifier, a particular respective score for each label of the plurality of labels, wherein the particular respective score represents a confidence of the trained classifier with respect to the label being correct for the document.

12. The non-transitory computer-readable storage medium of claim 11, wherein the trained classifier determines the particular respective score for each classification by at least:

determining, for each document portion of a plurality of document portions of the document, a respective sub-score for the document portion;

determining the particular respective score of the document based on aggregating the respective sub-score for each document portion of the plurality of document portions.

13. The non-transitory computer-readable storage medium of claim 12, wherein the steps further comprise:

assigning, to each document portion of the plurality of document portions a respective weight, wherein the sub-score for each document portion of the plurality of document portions is weighted by the respective weight for the document portion when aggregating the respective sub-score for each document portion of the plurality of document portions.

14. The non-transitory computer-readable storage medium of claim 12, wherein the steps further comprise:

selecting one or more document portions of the plurality of document portions of the document to include in the data based on the respective sub-score of each document portion of the plurality of document portions.

15. The non-transitory computer-readable storage medium of claim 9, wherein the document represents a medical report that discuss a respective target protein of a plurality of proteins and each label of the plurality of labels relates to at least one protein of the plurality of proteins.

16. The non-transitory computer-readable storage medium of claim 9, wherein each linguistic structure of the two or more linguistic structures is associated with at least one label of the plurality of labels, the two or more linguistic structures are displayed by the user interface in a visually distinguished manner compared to other one or more linguistic structures displayed by the user interface, and the user interface includes second user interface controls which, when selected, each cause toggling of the visually distinguished manner of one or more respective linguistic structures, of the portion of the two or more linguistic structures displayed by the user interface, that are associated with a particular respective label of the plurality of labels.

17. A system comprising:

an unlabeled document database storing one or more unlabeled documents;

a classification computer configured to:

obtain a document from the unlabeled document database;

determine, using a trained classifier, a candidate label for the document from a plurality of different labels;

change, based on a further input, one or more weights assigned to a highlighted section relative to a non-highlighted section during retraining of the trained classifier;

a verification computer configured to:

select two or more different linguistic structures from the document;

display a user interface that presents data from the document, including at least a portion of the two or more linguistic structures, the plurality of labels including the candidate label and respective scores in association with each different label among the plurality of labels, wherein the portion of the two or more linguistic structures are displayed by the user interface, wherein the user interface includes two or more user interface controls which present a first option to accept the candidate label for the document and a second option to select a different label for the document, the two or more user interface controls further presenting an element for highlighting the two or more linguistic structures within the document;

wherein one of the user interface controls is configured to allow selection from the plurality of different labels;

receive, via the one or more user interface controls, input representing selection of the first option or the second option, and the further input comprising a highlighted section of the two or more linguistic structures that was important to the selection of the first option or the second option;

associate the document with a verified label.

18. The system of claim 17, further comprising a labeled document database storing one or more unlabeled documents, wherein the trained classifier has been trained using a set of labeled documents, the verified label is the candidate label if the first option is selected by the input, the verified label is the different label if the second option is selected by the input, the verification computer is further configured to add the document and the verified label to the labeled document database, and the classification computer is further configured to retrain the trained classifier based on a second set of labeled documents from the labeled document database, wherein the second set of labeled documents includes the document and the verified label.

* * * * *